United States Patent [19]

Brew

[11] Patent Number: 5,161,370
[45] Date of Patent: Nov. 10, 1992

[54] CATALYTIC CONVERTER ACCESSORY APPARATUS

[76] Inventor: Kenneth Brew, 127 Goff Rd., Corning, N.Y. 14830

[21] Appl. No.: 664,095

[22] Filed: Mar. 4, 1991

[51] Int. Cl.⁵ .............................................. F01N 3/28
[52] U.S. Cl. ...................................... 60/299; 60/307; 422/176
[58] Field of Search ..................... 60/299, 307, 305; 422/176, 180

[56] References Cited

U.S. PATENT DOCUMENTS

| | | | |
|---|---|---|---|
| 3,144,309 | 8/1964 | Sparrow | 60/288 |
| 3,300,964 | 1/1967 | Knopp | 60/307 |
| 3,630,031 | 12/1971 | Grainger | 60/305 |

FOREIGN PATENT DOCUMENTS 147123  12/1978  Japan ........................... 60/299

Primary Examiner—Douglas Hart
Attorney, Agent, or Firm—Salzman & Levy

[57] ABSTRACT

The present invention features an automotive catalytic converter accessory device for improving its efficiency and operational life. The accessory device comprises a housing disposed in the manifold exhaust pipe, upstream of the catalytic converter. The housing contains a hollow conduit that conveys the exhaust gases of the manifold to the entrance or interface of the catalytic converter. The conduit comprises a plurality of injection orifices or a continuous annular orifice disposed about the periphery thereof. The orifices introduce air into the conduit passage. The air enters the conduit at spaced-apart, tangential angles with respect to the axis of longitudinal flow of the automotive exhaust gases. This causes a dynamic mixing of both air and exhaust gas, wherein both fluids begin to mix and swirl with respect to the flow axis. The swirling mixture then enters the catalytic converter, where by reason of its centrifugal action, the mixture is caused to expand into the wider converter cavity. The swirling expanding gases completely, and more uniformly, bathe the converter substrate.

15 Claims, 6 Drawing Sheets

CATALYTIC CONVERTER ACCESSORY APPARATUS

FIELD OF THE INVENTION

The invention relates to catalytic conversion of automobile exhaust gases, and more particularly to an accessory apparatus for uniformly distributing the exhaust gases flowing from the manifold exhaust pipe into the catalytic converter, such that substantially the entire catalytic surface area of the converter is uniformly bathed by the flowing exhaust stream.

BACKGROUND OF THE INVENTION

Present day automotive catalytic converter devices comprise a multichannel substrate whose flow-through channels are coated with noble metal catalyst materials to convert the pollutant exhaust gases to harmless effluent.

The automotive catalytic converters generally comprise large, oval shaped ceramic substrate housed in a metal sleeve or can. The converters connect directly to a manifold exhaust pipe, and generally discharge the purified gases to a muffler.

Exhaust gases entering the catalytic converter unit from the manifold exhaust pipe are generally specifically directed in their flow. That is, the gas flow tends to concentrate down the middle portion of the ceramic substrate, thus substantially avoiding the outer one-third of the substrate. This is a result of the narrow exhaust pipe cross-section, that feeds directly into the larger cross-sectional area of the substrate. The gases from the smaller exhaust pipe do not have a chance to radially diffuse as they enter the converter, and thus most of the exhaust gases flow down the middle of the substrate.

The result of this non-uniform bathing of the converter substrate is not only inefficient, but seriously limits the operational life of the converter.

It is also customary in some catalytic converter systems to inject air into the longitudinal mid-portion of the converter for the purpose of reducing the oxides of nitrogen emissions that are present in the exhaust gases. This procedure is also an inefficient use of converter substrate, since only a downstream portion of the substrate is provided with the oxygen enriched effluent.

The present invention seeks to provide an apparatus at the inlet of the converter that will more uniformly bathe the converter substrate with exhaust gases. The apparatus also has as an additional purpose to introduce air into the exhaust gas ahead of the frontal substrate interface to provide a more efficient treatment of nitrogen oxides as well as provide uniform gas distribution to the substrate.

The catalytic converter accessory of this invention uses a dynamic air/exhaust or an exhaust/exhaust gas mixture that provides a swirling diffusion of gases at the exhaust pipe/converter interface.

DISCUSSION OF RELATED ART

In U.S. Pat. No. 3,964,875, issued to Chang et al, on June 22, 1976, a pinwheel apparatus is provided ahead of the converter for the purpose of directing the exhaust gas effluent to the outer portions of the converter substrate. While this apparatus is successful in eliminating the center bathing of the catalytic substrate, is does not provide a uniform distribution of the exhaust gases. The velocity profile of the resultant flow stream clearly indicates that this device is directing more gaseous products to the outer portions of the substrate at the expense of the mid-portion.

In U.S. Pat. No. 4,209,495, issued on June 24, 1980 to Kobayashi et al, a device similar to the aforementioned Chang et al apparatus is shown. In this apparatus, the exhaust flow is directed by a number of different internal vanes or guide projections. This device also illustrates a diffuser cone positioned ahead of the converter in order to more uniformly bathe the catalytic substrate. While these various embodiments will direct the gas flow to the peripheral portions of the converter, there is no teaching or suggestion that any of these systems will provide a more uniform gas distribution. In other words, it is not demonstrated that the velocity profile is sufficiently flattened to provide a uniform bathing of the entire substrate cross-section.

In the combination diffusing cone and diverter apparatus illustrated in U.S. Pat. No. 4,783,959, issued to Sickels on Nov. 15, 1988, an attempt is made to provide a linear gas flow cross-section for the exhaust gas. While such a flow tends to flatten the distribution of the gases across the substrate interface, there is little benefit provided in reducing back pressure losses. In addition, this apparatus does not provide air injection for reduction of nitrogen oxides in the exhaust gas.

By contrast, the invention provides a device that substantially flattens the exhaust flow distribution across the entire substrate interface, whereby there is a uniform profile. In addition, by injecting air into the exhaust stream ahead of the converter, the invention also reduces the toxic nitrogen oxides. This injection also causes a dynamic swirling effect in the exhaust effluent that mixes the injected air with the exhaust gas to provide a more efficient oxidation of the pollutants, as well as a more uniform bathing of the converter substrate.

All of the above-mentioned references teach passive diffusion devices, wherein gas flow is influenced by fixed or passive restraints. The present invention, on the other hand, achieves the efficient bathing of the substrate of the converter by dynamic means, wherein diffusion of the exhaust gases is achieved by redirecting a portion of the exhaust flow itself or by a physical mixing of another fluid component: air.

SUMMARY OF THE INVENTION

In accordance with the present invention, there is provided an automotive catalytic converter accessory device for improving its efficiency and operational life. The accessory device comprises a housing disposed in the manifold exhaust pipe, upstream of the catalytic converter. The housing contains a hollow conduit that conveys the exhaust gases of the manifold to the entrance or interface of the catalytic converter. The conduit comprises a plurality of injection orifices or a continuous annular orifice disposed about the periphery thereof. The orifice(s) introduce air into the conduit passage. The air enters the conduit at spaced-apart, tangential angles with respect to the axis of longitudinal flow of the automotive exhaust gases. This causes a dynamic mixing of both air and exhaust gas, wherein both fluids begin to mix and swirl with respect to the flow axis. The swirling mixture then enters the catalytic converter, where by reason of its centrifugal action, the mixture is caused to expand into the wider converter cavity.

The swirling expanding gases completely, and more uniformly, bathe the converter substrate. In addition to more uniformly bathing the catalytic substrate, the expanding, swirling gases are more easily catalyzed by reason of the higher oxygen content.

The air can be injected into the conduit by reason of a pressure differential created within the conduit by the exhaust flow, or by pressurizing the air prior to its introduction into the conduit. Where a pressure differential is created, the conduit can be shaped to assist the introduction of the air.

It is an object of the present invention to provide an improved catalytic converter system.

It is another object of this invention to provide an accessory apparatus for use in conjunction with an automotive catalytic converter to more efficiently catalyze the exhaust gases streaming out of the manifold.

It is a further object of the invention to provide a catalytic converter system wherein the catalytic substrate is substantially uniformly bathed by the exhaust gases.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like elements and components will bear the same designation throughout the FIGS.

DESCRIPTION OF THE PREFERRED EMBODIMENT

Generally speaking, the invention features an accessory apparatus for use in an automotive catalytic converter system. The accessory apparatus provides for uniformly bathing the catalytic substrate of the converter with exhaust gas. The uniform bathing of the catalyst surfaces of the converter makes for a more efficient use of the converter substrate and extends its operational life. The accessory device works upon a dynamic flow principle, wherein the exhaust gases are caused to swirl about the longitudinal flow axis. The swirling gases entering the catalytic converter cavity expand by centrifugal action to fill the entire cavity, and hence uniformly bathe the catalytic substrate.

Figure 1:
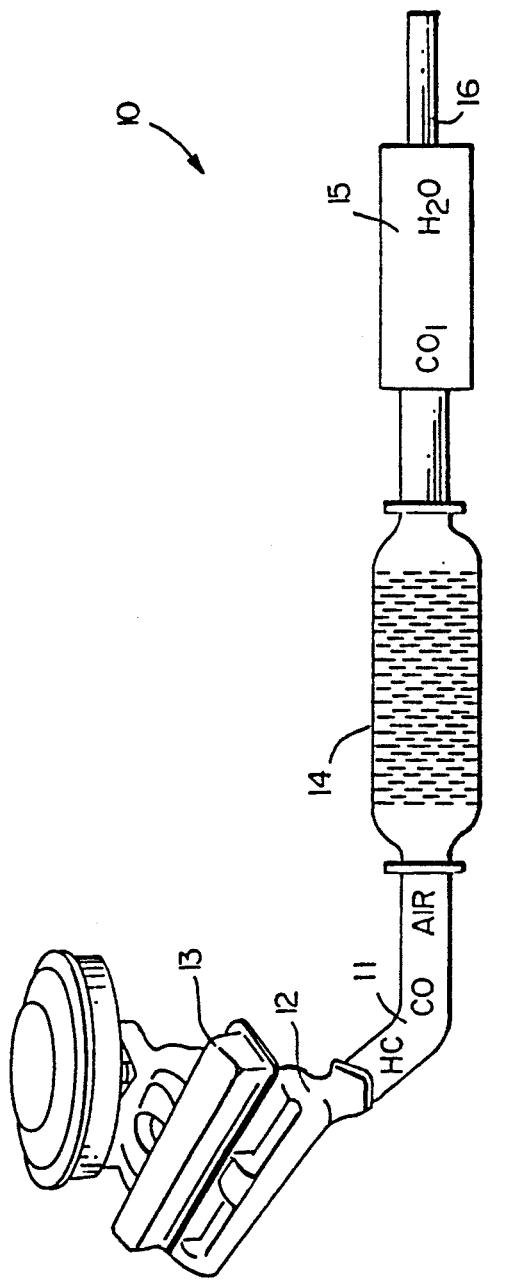
FIG. 1 is a schematic perspective view of the prior art catalytic converter exhaust system of an automobile.

Now referring to FIG. 1, a typical, prior art exhaust system 10 is illustrated. The system 10 comprises a manifold exhaust pipe 11 carrying the exhaust gases from the manifold 12 of engine 13. The exhaust gases flow into a catalytic converter 14, where the pollutants in the combusted gases are converted to harmless substances. From the converter 14, the effluent travel to the muffler 15, and are then exhausted to the atmosphere through the tail pipe 16.

The gases entering the converter 14 are narrowly directed into the converter through the smaller sized manifold exhaust pipe 11, such that only a portion of the substrate 30 is bathed in the exhaust effluent. This is very inefficient use of the substrate 30.

Figure 2:
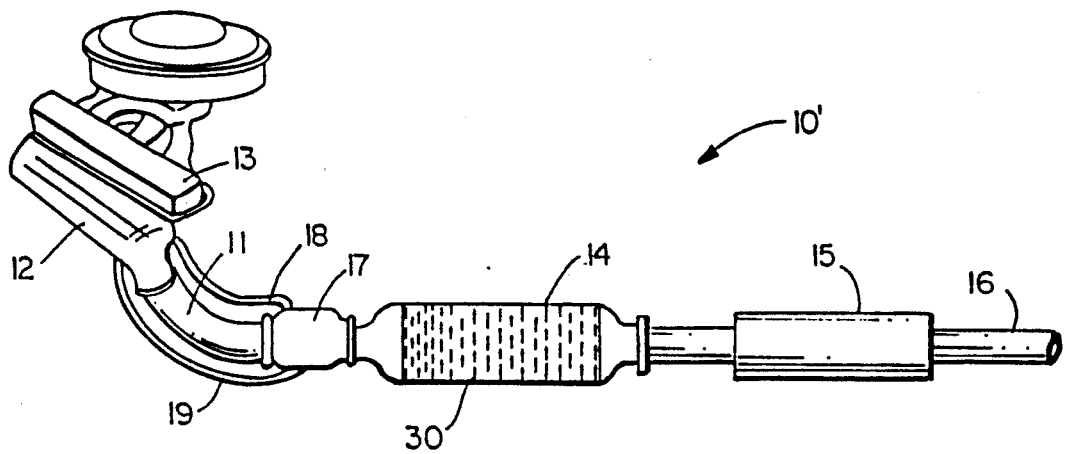
FIG. 2 is a schematic perspective view of the automotive catalytic converter exhaust system of the invention.

Referring to FIG. 2, a modified exhaust system 10' is shown, having an accessory device 17 disposed within the manifold exhaust pipe 11, upstream of the catalytic converter 14. The gases flowing through the manifold exhaust pipe 11 feed into the accessory device 17 on their way to converter 14. Air is also fed from the air management valve of the automobile engine 13 (not shown), through lines 18 and 19, respectively, to the accessory device 17. The air can also be introduced under pressure from a super charger through lines 18 and 19. The air is introduced by reason of the pressure differential between lines 18, 19 and internal cavity 21 (FIG. 3) of the accessory device 17. This differential can be either a positive or negative differential. That is, the air either can be injected under a higher pressure, or can be sucked into the accessory device 17 by reason of a lower pressure in the air lines.

Figure 3:
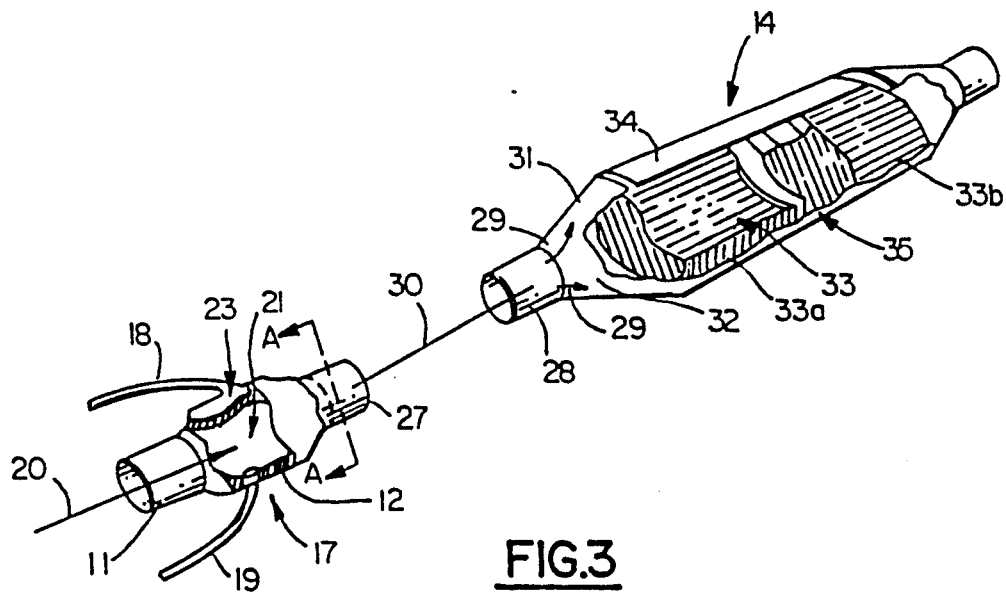
FIG. 3 is a partial exploded, cutaway view of the converter and exhaust accessory device of this invention in accordance with FIG. 2.

Referring to FIG. 3, the accessory device 17 and catalytic converter 14 are shown in partial cutaway in order to reveal more details of their construction and operation.

The exhaust gases flow from the manifold exhaust pipe 11 into the accessory device 17, as shown by arrow 20. The gases flow into a hollow chamber 21 defined by the housing walls 22 of device 17. The air from lines 18 and 19 also enter the chamber 21 via orifice(s) 23 and 24, respectively. The air entering chamber 21 is tangentially directed from the periphery of walls 22 at an angle of approximately between thirty and forty-five degrees. The directed air mixes with the exhaust gases flowing through the chamber (arrow 20) and begins to cause a swirling or rotational action in the gas mixture. Only two orifices 23 and 24 are shown in FIG. 3, but any number of orifices from two through eight or a continuous annular orifice can be utilized to dynamically swirl the exhaust gases. The swirling gas mixture discharged from the outlet 27 of accessory device 17, then enters the inlet 28 of the catalytic converter 14. When the swirling gas mixture enters the expanded cone portion 31 of the converter housing 34, the swirling gases will expand outwardly under centrifugal force (arrows 29) to fill the entire cone cavity 32. This expansion of the gases provides a substantially complete bathing of the catalytic substrate 33. In this fashion, all the catalytically coated surfaces or channels of the catalytic substrate 33 will be fully utilized, thus improving the efficiency of the converter 14.

The substrate 33 in the converter housing 34 is generally separated into two halves 33a and 33b, respectively, as illustrated in FIG. 3. In many catalytic systems, air is introduced in the mid-portion of housing 34 between the two substrate halves, as depicted by arrow 35. The purpose of the air introduction is to convert the toxic nitrogen oxides in the exhaust gases. While this is effective, it is clearly observed that only the second half 33b of substrate 33 can be utilized for this purpose.

The invention, on the other hand, can utilize both halves 33a and 33b with the introduction of air in accessory device 17 ahead of the converter 14.

Figure 4:
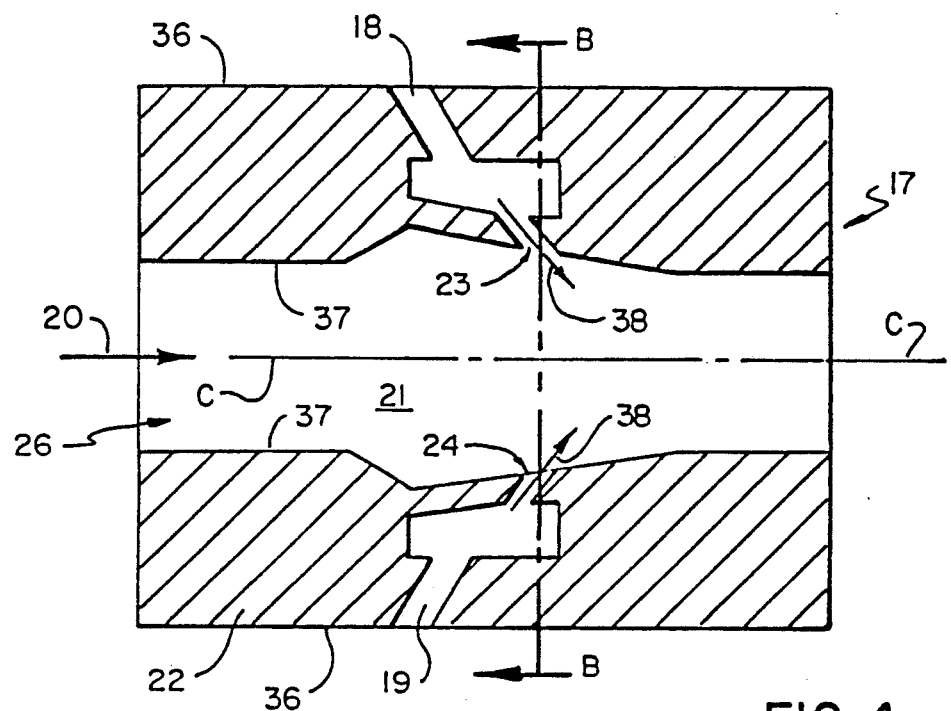
FIG. 4 is a sectional view of the accessory device illustrated in FIG. 3, taken along a mid-axis A—A.

Referring to FIG. 4, an enlarged sectional view of the accessory device 17 of FIG. 3, is illustrated. The housing walls 22 of the accessory device 17 are defined by an outer wall 36 and an inner wall 37, as shown. Inner wall 37 further defines a chamber 21. Lines 18 and 19 feed into chamber 21 via respective orifices 23 and 24. Orifices 23 and 24 are angled at 30 degrees to the exhaust gas flow axis C. These discrete orifices, in an alternate embodiment, could be replaced by a continuous annular orifice having the same angular dimension. The flowing exhaust gases entering (arrow 20) the chamber 21 through inlet 26 of the accessory device 17 will be impinged by the injected air (arrows 38) entering the chamber 21 through the orifices 23 and 24, respectively. A swirling action will then result as the two gases form a mixture within chamber 21.

Figure 5:
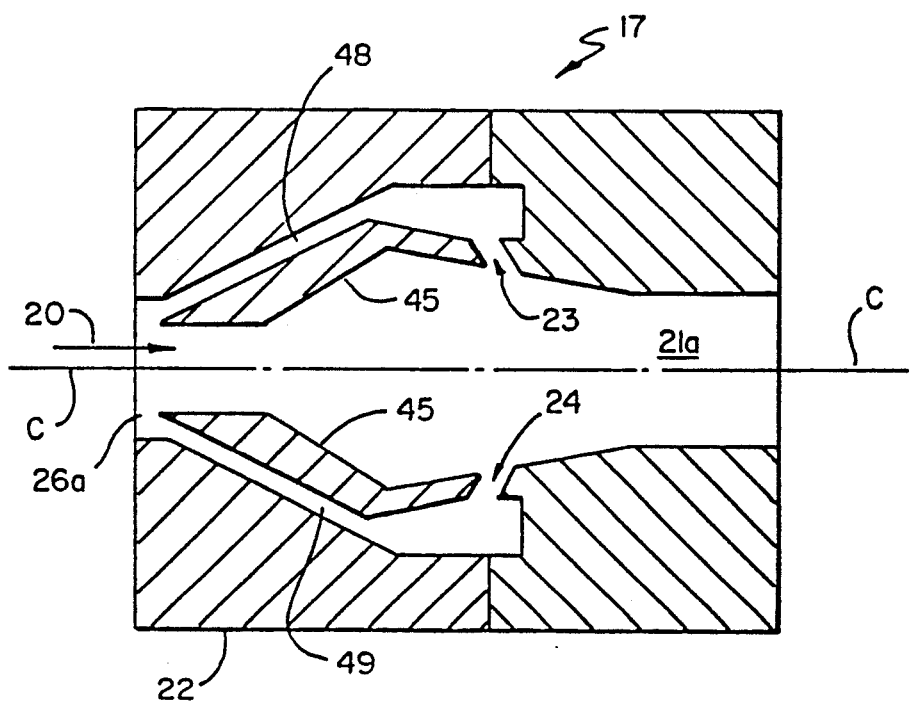
FIG. 5 is a sectional view of an alternate embodiment of the accessory device depicted in FIG. 4.

Referring to FIG. 5, an alternate embodiment to the chamber 21 of FIG. 4, is illustrated. The modified chamber 21a comprises a modified inlet 26a, that diverts a portion of the entering exhaust gases (arrow 20) into internal lines 48 and 49. The diverted exhaust gas travels through internal lines 48 and 49, respectively, and is then reintroduced into chamber 21a through orifice(s) 23 and 24, respectively. The exhaust gas portions entering chamber 21a through orifice(s) 23 and 24 are essentially at the pressure of the exhaust gas entering at inlet 26a. The main stream portion of the gases flowing along axis C, however, are caused to experience a diffusion by virtue of the diffuser cone surface 45 in the modified chamber 21a configuration. The diffused exhaust gas main stream is at lower pressure than the inlet exhaust gas and the orifice fed exhaust gas. The resulting differential in pressure between the diverted and main stream gases, causes a swirling action to occur in chamber 21a. The incoming gases via orifice(s) 23 and 24, respectively are forcibly injected into the chamber 21a thereby producing a rotational movement about axis C.

This embodiment does not introduce air into the exhaust gas, but rather utilizes the exhaust gas itself to provide the swirling action necessary to bathe the entire substrate 33 of converter 14.

Figure 6:
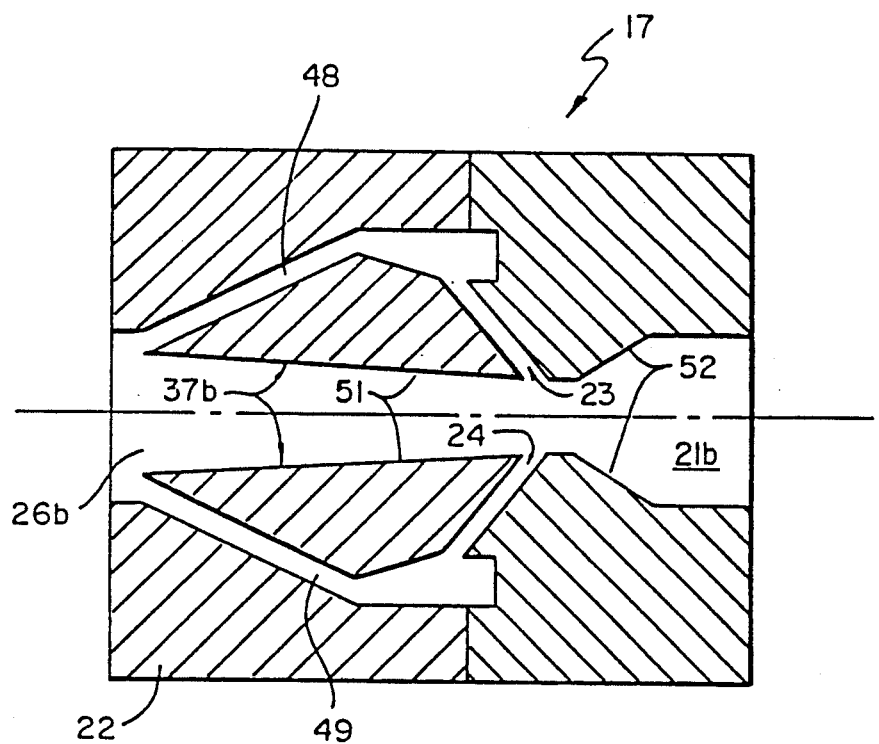
FIG. 6 is a sectional view of another alternate embodiment of the accessory device shown in FIG. 4.

Referring to FIG. 6, a further embodiment of chamber 21 of FIG. 4, is illustrated. The modified chamber 21b has its inner walls 37b shaped in the form of a venturi tube: an initial compressor cone portion 51, followed by a diffuser cone portion 52. The inlet 26b to the venturi chamber 21b diverts a portion of the exhaust gas in similar fashion to that shown in FIG. 5. The orifice(s) 23 and 24 are placed at the juncture between the compressor cone 51 and diffuser cone 52, thus causing the higher pressure, diverted exhaust gas in lines 48 and 49 to be forced into the lower pressure diffuser cone portion 52 of chamber 21b. This embodiment uses the exhaust gas itself to provide the swirling action to the main stream exhaust, similar to the embodiment shown in FIG. 5.

Figure 7:
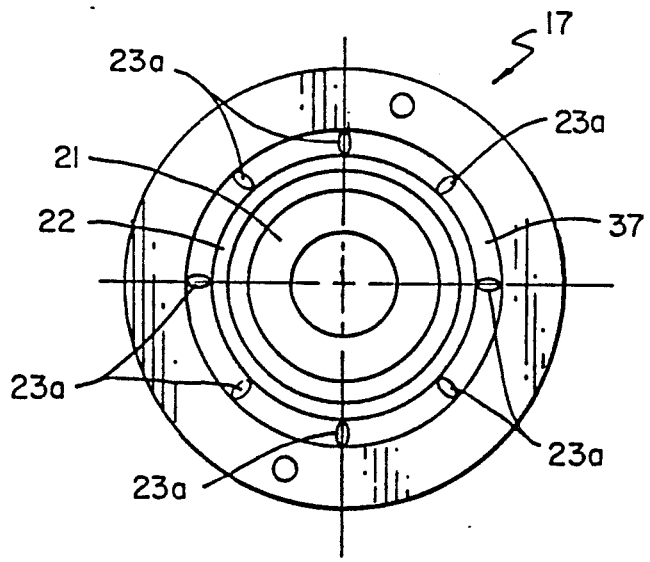
FIG. 7 is a sectional bottom view of the accessory device shown in FIG. 4, taken along axis B—B.

FIG. 7, depicts a sectional view of the chamber 21 illustrated in FIG. 4. The chamber 21 shows eight orifices 23a disposed about the periphery of inner wall 37. The use of eight orifices 23a provides a more uniform mixing of the air and exhaust gas mixture in chamber 21. Any number of orifices can be provided, with the preferred number being between two and eight. As previously mentioned, an annular orifice can also be used to introduce the gas mixing. The angle of gas introduction can vary between the orifices, wherein a more progressive angle can be provided as the orifices proceed around the periphery of the chamber 21. The orifice angles may also be divided between 30 and 45 degrees, and each subsequent orifice may alternate in the angle of introduction.

Figure 8:
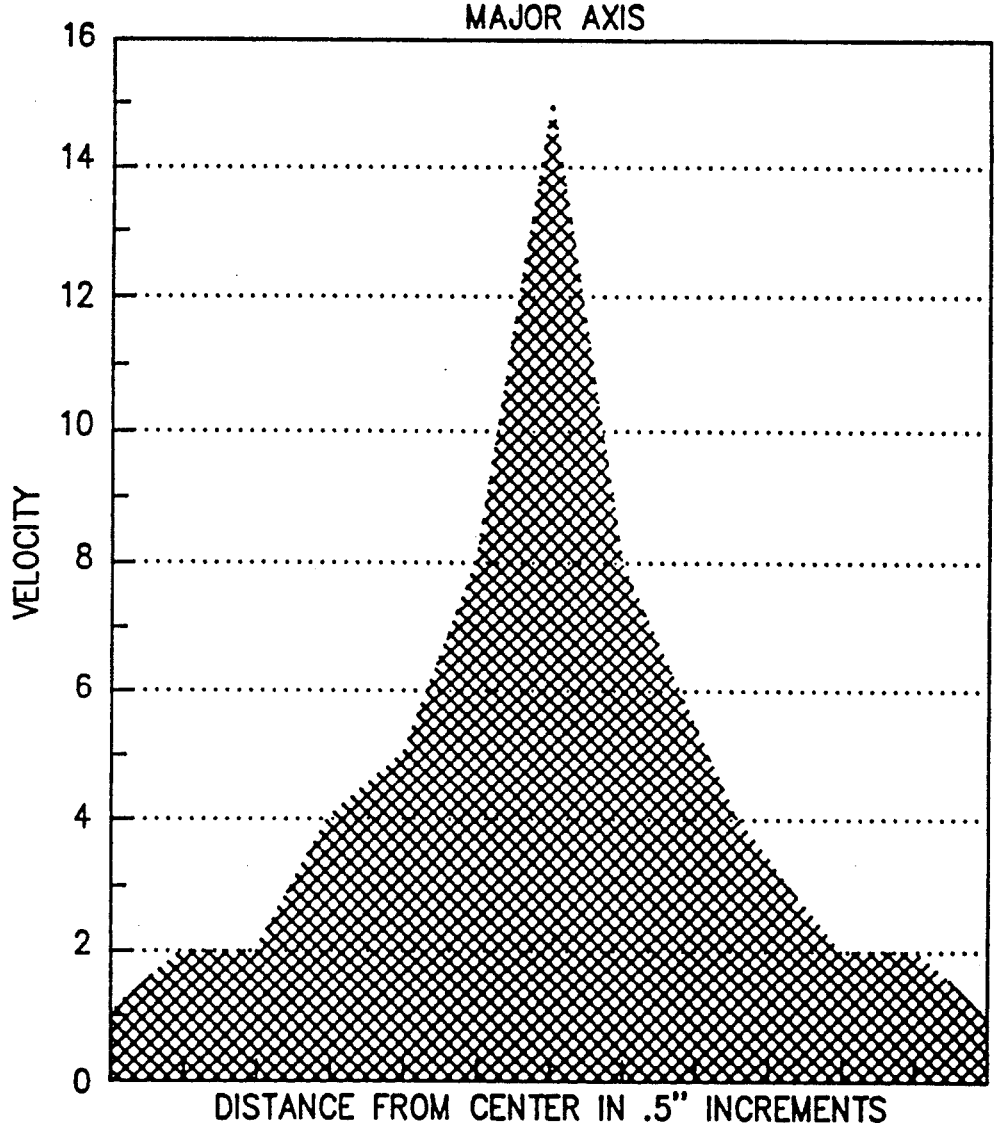
FIG. 8 is a graph of the velocity profile of the exhaust gas flowing through the catalytic converter of the prior art system of FIG. 1.

Referring to FIG. 8, a velocity profile of the exhaust gas entering the converter 14 in the prior art system of FIG. 1, is shown. As is evident from the profile, the center portion of the incoming gases has the highest velocity, while the outer portion of the exhaust stream is at much lower velocity. Such a gas profile indicates that most of the incoming exhaust gas is directed down the mid-portion of substrate 33, and very little of the remaining gas is caused to bathe the outer portions of the substrate 33.

Figure 9:
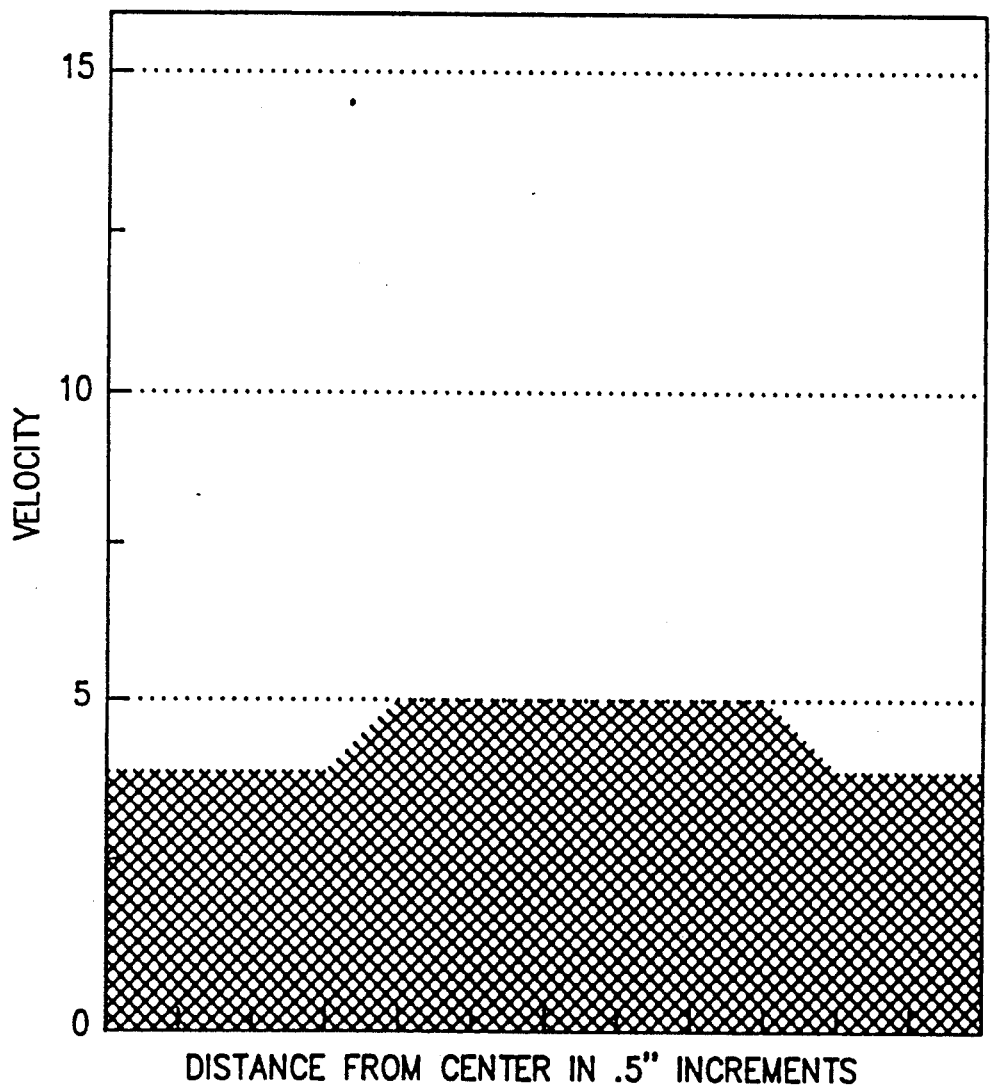
FIG. 9 is a graph of the velocity profile of the exhaust gas flowing through the catalytic converter of the inventive system illustrated in FIG. 2.

Referring to FIG. 9, a very flat or uniform velocity profile of the exhaust gas entering the converter 14 is shown. This flat profile is a result of the inventive accessory device introduced into the system illustrated in FIG. 2. The uniform profile indicates that substantially the entire face of the substrate 33 has been bathed by the incoming exhaust gases. The invention therefore provides a more efficient use of the substrate 33 of converter 14.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by LETTERS PATENT is presented by the subsequently appended claims.

What is claimed is:

1. An exhaust device for use in an automotive catalytic converter system, said exhaust device being disposed between an exhaust manifold and a catalytic converter of the catalytic converter system to provide a substantially uniform bathing of a catalytic substrate of the converter with exhaust gases, said exhaust device comprising:

a housing device an inner chamber comprising a inlet for receiving flowing manifold exhaust gases, said inlet including means for diverting a portion of said manifold exhaust gases into said chamber in a downstream portion thereof, said manifold exhaust gases being conveyed to an inlet portion of a catalytic converter;

means defining an axis of flow within said chamber for conveying said flowing manifold exhaust gases therethrough; and means defining a plurality of orifices integrally disposed about a periphery of said chamber and forming an annular injection mechanism for introducing gas into said chamber along said axis of flow at an angle to said axis of flow, for causing said flowing manifold exhaust gases to swirl substantially uniformly about said axis of flow, whereby the swirling manifold gases will be caused to expand as they enter the inlet portion of said catalytic converter and thereby substantially uniformly bathe the substrate of the catalytic converter.

2. The exhaust device of claim 1, wherein said plurality of orifices comprise between two and eight orifices.

3. The exhaust device of claim 1, wherein each orifice of said plurality of orifices introduces air into the flowing manifold exhaust gases, thus forming a mixture.

4. The exhaust device of claim 1, wherein each orifice of said plurality of orifices introduces gas into said chamber at angles approximately between 30° and 45° with respect to said axis of flow.

5. The exhaust device of claim 4, wherein each orifice of said plurality of orifices introduces gas into said chamber at alternating angles of approximately 30° and 45°.

6. An exhaust device for use in an automotive catalytic converter system, said exhaust device being disposed between an exhaust manifold and a catalytic converter of the catalytic converter system to provide a substantially uniform bathing of a catalytic substrate of the converter with exhaust gases, said exhaust device comprising:
  a housing having an inner chamber for conveying flowing manifold exhaust gases to an inlet portion of a catalytic converter;
  means defining an axis of flow within said chamber for conveying said flowing manifold exhaust gases therethrough; and
  a substantially continuous annular orifice integrally disposed about a periphery of said chamber for introducing gas into said chamber along said axis of flow at an angle to said axis of flow, for causing said flowing manifold exhaust gases to swirl about said axis of flow, whereby the swirling manifold gases will be caused to expand as they enter the inlet portion of said catalytic converter and thereby substantially uniformly bathe the substrate of the catalytic converter.

7. The exhaust device of claim 6, wherein said annular orifice introduces gas into said chamber at angles approximately between 30° and 45° with respect to said axis of flow.

8. An exhaust device for use in an automotive catalytic converter system, said exhaust device being disposed between an exhaust manifold and a catalytic converter of the catalytic converter system to provide a substantially uniform bathing of a catalytic substrate of the converter with exhaust gases, said exhaust device comprising:
  a housing having an inner chamber for conveying flowing manifold exhaust gases to an inlet portion of a catalytic converter;
  means defining an axis of flow within said chamber for conveying said flowing manifold exhaust gases therethrough; and
  a substantially continuous annular orifice integrally disposed about an inner periphery of said chamber for introducing gas into said chamber at an angle to and along said axis of flow, for causing said flowing manifold exhaust gases to swirl about said axis of flow, whereby the swirling manifold gases will be caused to expand as they enter the inlet portion of said catalytic converter, and thereby substantially uniformly bathe the substrate of the catalytic converter.

9. The exhaust device of claim 8, wherein said means for introducing gas into said chamber comprises between two and eight orifices disposed about an inner periphery of said chamber.

10. The exhaust device of claim 9, wherein each orifice of said plurality of orifices introduces air into the flowing manifold exhaust gases, thus forming a mixture.

11. The exhaust device of claim 9, wherein each orifice of said plurality of orifices introduces gas into said chamber at angles approximately between 30° and 45° with respect to said axis of flow.

12. The exhaust device of claim 11, wherein each orifice of said plurality of orifices introduces gas into said chamber at alternating angles of approximately 30° and 45°.

13. The exhaust device of claim 8, wherein said chamber comprises means defining an inlet for said flowing manifold exhaust gases, and wherein said inlet includes means for diverting a portion of said flowing manifold exhaust gases into the chamber via a plurality of orifices, in a downstream portion of said chamber.

14. The exhaust device of claim 8, wherein said annular orifice introduces air into the flowing manifold exhaust gases, thus forming a mixture.

15. The exhaust device of claim 8, wherein said annular orifice introduces gas into said chamber at angles approximately between 30° and 45° with respect to said axis of flow.

* * * * *